SORTING DEVICE FOR INFORMATION BEARING ELEMENTS

Filed Feb. 23, 1955 14 Sheets-Sheet 1

ARTHUR W. TYLER
CARTER J. HUGHEY
WILLIAM C. THOMAS
INVENTORS
BY
ATTORNEY & AGENT

SORTING DEVICE FOR INFORMATION BEARING ELEMENTS

Filed Feb. 23, 1955 14 Sheets-Sheet 2

ARTHUR W. TYLER
CARTER J. HUGHEY
WILLIAM C. THOMAS
INVENTORS

BY Daniel I. Mayne
Lloyd F. Seebach
ATTORNEY & AGENT

June 11, 1957 A. W. TYLER ET AL 2,795,328

SORTING DEVICE FOR INFORMATION BEARING ELEMENTS

Filed Feb. 23, 1955 14 Sheets-Sheet 3

ARTHUR W. TYLER
CARTER J. HUGHEY
WILLIAM C. THOMAS
INVENTORS

BY Daniel I. Mayne,
Lloyd F. Seebach
ATTORNEY & AGENT

June 11, 1957 A. W. TYLER ET AL 2,795,328

SORTING DEVICE FOR INFORMATION BEARING ELEMENTS

Filed Feb. 23, 1955 14 Sheets-Sheet 4

ARTHUR W. TYLER
CARTER J. HUGHEY
WILLIAM C. THOMAS
INVENTORS

BY Daniel I. Mayne
Lloyd F. Liebach
ATTORNEY & AGENT

SORTING DEVICE FOR INFORMATION BEARING ELEMENTS

ARTHUR W. TYLER
CARTER J. HUGHEY
WILLIAM C. THOMAS
INVENTORS
BY Daniel J. Mayne
Lloyd F. Seebach
ATTORNEY & AGENT

SORTING DEVICE FOR INFORMATION BEARING ELEMENTS

Filed Feb. 23, 1955 14 Sheets-Sheet 6

ARTHUR W. TYLER
CARTER J. HUGHEY
WILLIAM C. THOMAS
INVENTORS

BY Daniel I. Mayne
Lloyd F. Sebach
ATTORNEY & AGENT

ARTHUR W. TYLER
CARTER J. HUGHEY
WILLIAM C. THOMAS
INVENTORS
BY Daniel I. Mayne
Lloyd F. Seebach
ATTORNEY & AGENT

SORTING DEVICE FOR INFORMATION BEARING ELEMENTS

ARTHUR W. TYLER
CARTER J. HUGHEY
WILLIAM C. THOMAS
INVENTORS
BY Daniel I. Mayne
Lloyd F. Seebach
ATTORNEY & AGENT

ARTHUR W. TYLER
CARTER J. HUGHEY
WILLIAM C. THOMAS
INVENTORS

BY Daniel I. Mayne
Lloyd F. Seebach
ATTORNEY & AGENT

June 11, 1957 A. W. TYLER ET AL 2,795,328

SORTING DEVICE FOR INFORMATION BEARING ELEMENTS

Filed Feb. 23, 1955 14 Sheets-Sheet 10

ARTHUR W. TYLER
CARTER J. HUGHEY
WILLIAM C. THOMAS
INVENTORS

BY Daniel I. Mayne

Lloyd F. Seebach
ATTORNEY & AGENT

SORTING DEVICE FOR INFORMATION BEARING ELEMENTS

Filed Feb. 23, 1955 14 Sheets-Sheet 11

ARTHUR W. TYLER
CARTER J. HUGHEY
WILLIAM C. THOMAS
INVENTORS

BY Daniel I. Mayne
Lloyd F. Seebach
ATTORNEY & AGENT

SORTING DEVICE FOR INFORMATION BEARING ELEMENTS

Filed Feb. 23, 1955 14 Sheets-Sheet 12

ARTHUR W. TYLER
CARTER J. HUGHEY
WILLIAM C. THOMAS
INVENTORS
Daniel I. Mayne
BY Lloyd F. Seebach
ATTORNEY & AGENT June 11, 1957 A. W. TYLER ET AL 2,795,328

SORTING DEVICE FOR INFORMATION BEARING ELEMENTS

Filed Feb. 23, 1955 14 Sheets-Sheet 13

ARTHUR W. TYLER
CARTER J. HUGHEY
WILLIAM C. THOMAS
INVENTORS

BY Daniel I. Mayne

Lloyd F. Seebach
ATTORNEY & AGENT

SORTING DEVICE FOR INFORMATION BEARING ELEMENTS

Filed Feb. 23, 1955 14 Sheets-Sheet 14

ARTHUR W. TYLER
CARTER J. HUGHEY
WILLIAM C. THOMAS
INVENTORS

BY Daniel I. Mayne
Lloyd F. Seebach
ATTORNEY & AGENT

United States Patent Office 2,795,328

Patented June 11, 1957

2,795,328

SORTING DEVICE FOR INFORMATION BEARING ELEMENTS

Arthur W. Tyler, Carter J. Hughey, and William C. Thomas, Rochester, N. Y., assignors to Eastman Kodak Company, Rochester, N. Y., a corporation of New Jersey Application February 23, 1955, Serial No. 490,077

18 Claims. (Cl. 209—73)

This invention relates to a device for automatically sorting a plurality of information bearing elements having a code thereon and more particularly to a device in which such elements are sorted by moving the elements with respect to a plurality of stations and reading the code on each element as it moved from one station to any one of the other stations to determine the station to which each element is to be delivered and is a continuation-in-part of patent application Serial No. 365,501 filed July 1, 1953, and now abandoned.

In various sorting systems utilizing punched cards, the cards are fed from a stack and over a plurality of hoppers or receptacles. Ahead of each receptacle a group of brushes are arranged in the path of the cards and are set with respect to the lines of possible apertures in the card and in accordance with some predetermined code. When a card is moved under the brushes and has an array of punched apertures corresponding to the arrangement of the brushes, a circuit is completed to actuate a solenoid for moving a deflector plate into the path of the card to direct it into the corresponding hopper or receptacle. To sort a group of such cards into numerical ascending or descending order, a sorting of the first or units digit is made, then a sorting of the second or tens digit is made, then the third digit and so on until the sorting has been completed. In instances where ten such digits are used, ten sortings are necessary. In the types of sorting equipment utilized for punched cards at the present time, it is necessary for the operator to transfer the cards from each hopper to the feeder after each sorting, the cards being stacked in ascending or descending order depending on the numerical sequence desired. Such sorters may be classified as automatic if only one sort is made; however, for more than one sorting the operator must be in attendance to manually arrange the cards in the feeder in proper order after each sorting.

The present invention relates to the sorting of information bearing elements having a code thereon, such elements being produced photographically. The elements are provided with an image area in which the documents, cards, etc., are exposed and recorded and a code area in which the information or subject matter of the documents photographed is coded. Accordingly, the elements may be of photographic film, photographic paper or a light-sensitive coating on metal or glass. However, the apparatus for sorting such elements can be readily adapted to sorting of punched cards or other types of code bearing sheet material. The term "element" is, therefore, meant to include chips, cards, sheets, etc., whether of a light-sensitive material, paper, metal, glass or composition. The invention relates to a sorter which is completely automatic and eliminates the need for handling the elements between each sorting. This is accomplished by moving the elements back and forth between at least two groups of stations or moving the elements continuously in the same direction with respect to at least two groups of stations. The stations are capable of not only receiving the elements but are also capable of having the elements removed therefrom.

The station or groups of stations can be arranged in several different ways. The elements can be removed from one station, moved past a selecting or reading station, and delivered to any one of the other stations in accordance with code on each element, the path of movement being in straight line. Two groups of stations can be arranged in a straight line with a selecting station positoned between the groups, or the path of movement of the elements can be closed in which case the groups of stations and selecting stations are arranged rectangularly or about an axis to provide a circular arrangement. In each instance the sorting is accomplished in the same manner and by utilizing a selecting station between each group of stations, the movement of the elements is always in the same direction.

The sorting of the elements is accomplished in the following manner. A stack of elements is placed in one of the stations in one of the groups designated as the feeding station, each group of stations comprising ten stations representative of the digits 0 through 9 and can include a "reject" station. The elements are removed successively from the top of the stack and moved past the selecting station between the groups of stations, the code on the element determining the station in the other group to which the element is to be delivered, and the selecting means which is responsive to the codes determines the instant at which the respective stations are to receive the elements designated therefor. Upon completion of the first sorting, the elements will be distributed in the ten stations in accordance with the least significant digit of the code; that is, all the elements having a code designating "9" will be in the "9" station and so on through the "0" station. Since the elements are not removed from their respective stations and grouped into a single stack for the second sorting, the sortings after the first sorting are alternated from the "9" station and the "0" station of each group of stations. For example, if the stack is placed in one of the stations of the group designated as "A," the first sorting is made to the stations in the other group designated as "B." If the second sorting is then made commencing with the "9" station in group "B," the third sorting is made commencing with the "0" station in group "A," etc. In other words, the even-numbered sortings will be made commencing with the "9" station in group "B" and the odd number sortings will be made from the "0" station in group "A." In each sorting the elements are removed successively from the stations in an order reversed from that in which the elements were received and all the elements from one station are removed before those of the next succeeding station.

If an odd number of sorts are made, the elements will be finally distributed in the "B" group of hoppers and are in reverse order so that the elements must be fed to a single station in the "A" group. When an even number of sorts are made, the elements are distributed finally in the stations of the "A" group in proper order and need only to be stacked. In the event the order of sorting is reversed; that is, the second or even sorts are made from "B" group commencing with the "0" station and the third or odd sorts are made from "A" group commencing with the "9" station, then the even sorts will have to be moved from each station into a single station in the "B" group and odd sorts can be stacked directly from the stations in the "A" group.

A translating means is provided for removing the elements successively from one station in a group and successively from the stations in the same group and for moving said elements past the selecting or sensing station to any one of the stations in the other group. Such a translating means can be continuously or intermittently operated and is operative until the number of sortings required have been completed. By means of a selecting means cooperating with the translating means and responsive to the code on the elements, the station from which the elements are to be removed and the station to which the elements are to be delivered are properly controlled as to sequence of operation. With this arrangement of stations, translating means and selecting means, a sorting is accomplished automatically and in such a way that the operator need only handle the elements to place them in the proper station at the start of the sorting and to remove them when the complete sorting has been finished.

It is the primary object of the invention, therefore, to provide a fully automatic sorter for code bearing elements in which the elements are moved from one station to any one of several other stations in accordance with the code on each element.

Another object of the invention is to provide a fully automatic sorter for code bearing elements in which the elements are moved between two groups of stations from any one station in one group to any one of the stations in the other group.

Still another object of the invention is to provide a fully automatic sorter for code bearing elements in which the stations are adapted to have the elements automatically and individually removed therefrom and to receive individual elements delivered thereto.

Yet another object of the invention is to provide a fully automatic sorter for code bearing elements in which the groups of stations form a closed path for movement of the elements between the stations of the groups thereby permitting movement of the elements in the same direction.

A further object of the invention is to provide a fully automatic sorter for code bearing elements in which the groups of stations form a closed circular path for movement of the elements between the stations of said groups.

And still another object of the invention is to provide a fully automatic sorter for code bearing elements which eliminates any handling of the elements between successive sortings and which is accurate and operable at a high rate of speed.

Other objects and advantages of the invention will be apparent to those skilled in the art from the detailed description which follows.

Reference is now made to the accompanying drawings wherein like reference numerals designate like parts and wherein.

Figure 1:
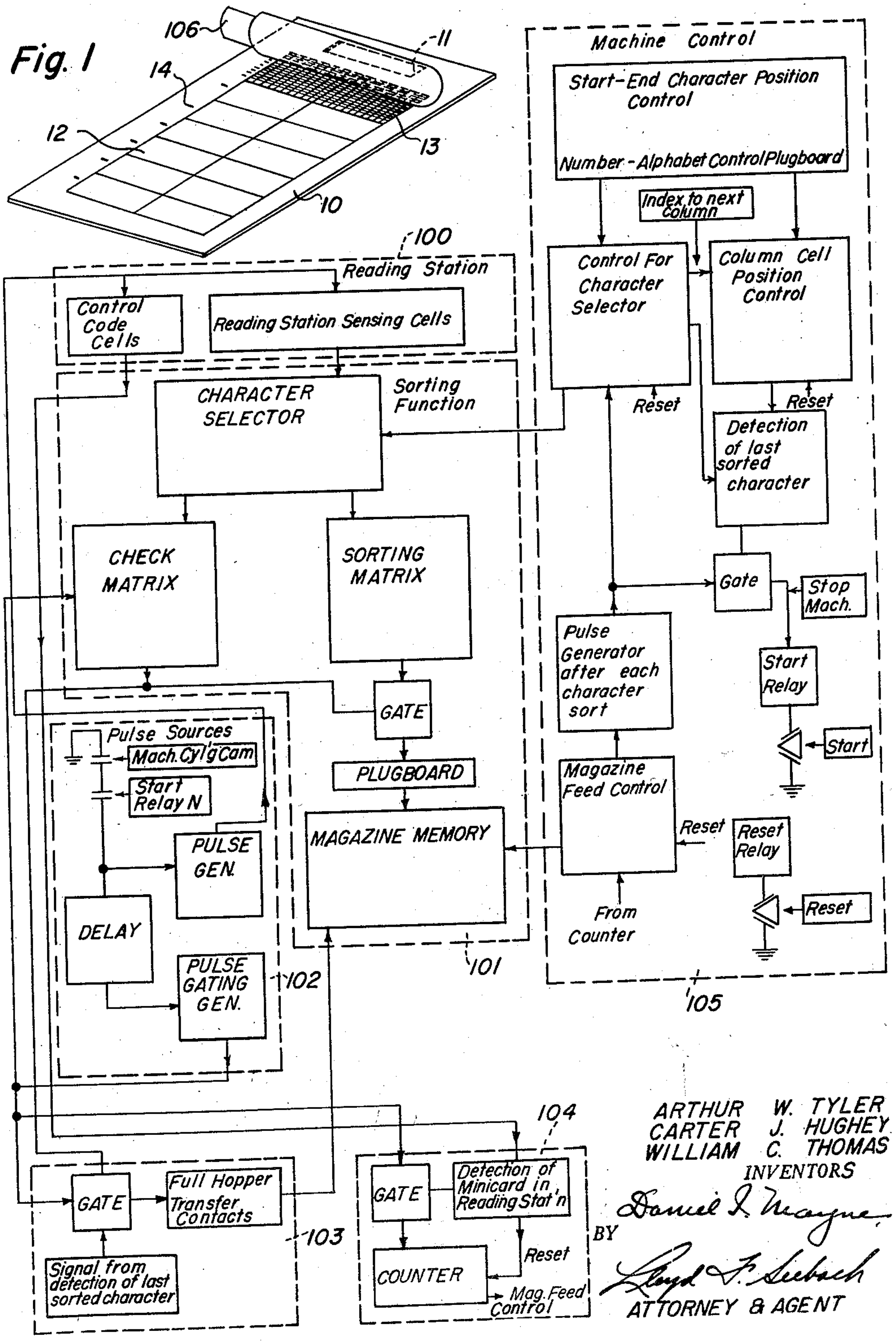
Fig. 1 is a diagrammatic view showing an information bearing element in conjunction with block diagrams of the circuits included in the selecting means for determining the stations from which the elements are to be removed and the stations to which the elements are to be delivered.

The information bearing element 10 disclosed in Fig. 1 is preferably of a light-sensitive material having an opening 11 at one end thereof, an image area 12, and a code area 13 between the aperture and image area. Image area 12 is of such size as to accommodate twelve image areas arranged as shown and code area 13 comprises forty-two columns of ten rows as shown, or more. Along one edge of the image and code areas control marks 14 are exposed centrally of the width of each image area and of each row of code at the time element 10 is exposed. The individual image areas are sufficiently large to produce an image of a letter size document. As stated hereinbefore element 10 can be of photographic film or paper, of metal or glass coated with a light sensitive material, paper, cardboard or any composition material, the type of material determining whether the scanning of the code area is accomplished by transmission or reflection. Inasmuch as elements 10 are relatively small, it has been found advisable to handle them as units and, as a result, aperture 11 is non-circular to permit insertion of said elements on an elongated member 19 without rotation or movement thereon, as disclosed in Fig. 7.

Figures 2, 3, 4:
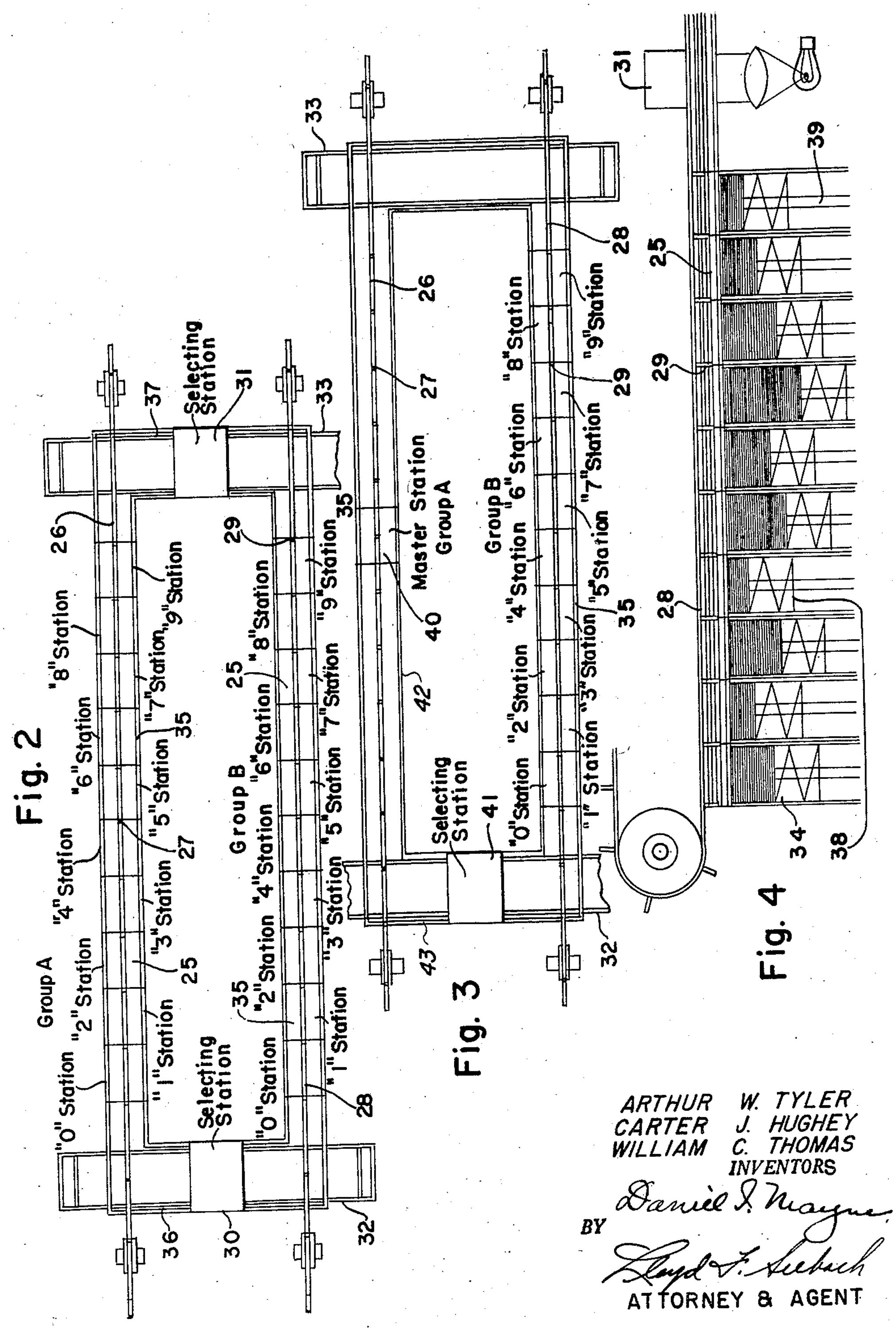
Fig. 2 is a plan view of an arrangement of two groups of stations arranged in spaced parallel relation to provide a closed path of movement for the elements.
Fig. 3 is a plan view of another arrangement of stations providing a closed path of movement for the elements in which one group of stations comprises only a single station.
Fig. 4 is a side elevation of a group of stations as shown in Figs. 2 and 3.
Figure 5:
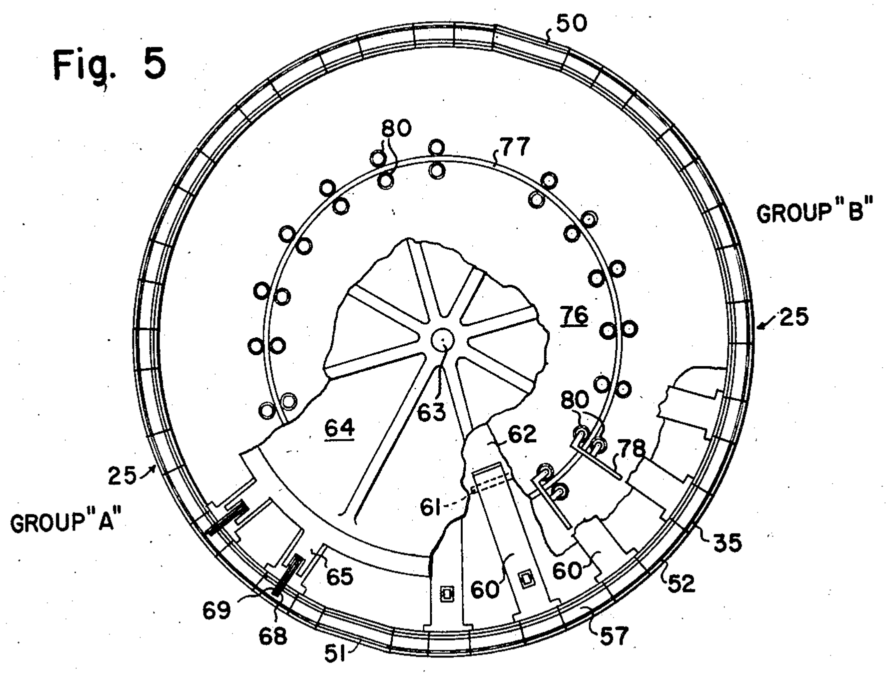
Fig. 5 is a plan view of an embodiment of the invention in which the groups of stations are arranged to provide a closed circular path of movement for said elements in a horizontal plane.

With reference to Figs. 2, 3 and 4, a plurality of stations 25 are arranged to provide a closed rectangular path of movement for elements 10 which are moved with respect to said stations. In Fig. 2 stations 25 are arranged in two groups of ten stations each and in spaced parallel relation for permitting elements 10 to be stacked in a vertical direction, as shown in Fig. 4. As stated hereinbefore, each group of stations can also include a "reject" station for a purpose described hereinafter.

The translating means comprises an endless chain 26 having fingers 27 which are moved over stations 25 in group A and an endless chain 28 having fingers 29 which are moved over stations 25 in group B. Positioned between the stations of groups A and B are selecting stations 30 and 31 which determine from the code on each element the station to which each element is to be delivered. Arranged under stations 30 and 31 are endless chains 32 and 33 also having fingers, not shown, and forming a part of the translating means which move elements 10 from the path of chain 28 to that of chain 26, respectively. Stations 25 comprise a receiving and feeding hopper 34 having a track section 35 arranged thereover and in which track sections elements 10 are moved from any one station in one group to any station in the other group. Track sections 35 are movable with respect to hoppers 34 in a manner to be described hereinafter to permit elements 10 to be removed from or delivered to said hoppers. The end track sections 36 and 37 connecting the stations of group A and of group B are fixed in position. As is well-known, elements 10 are maintained with respect to track sections 35 by coil springs 38 in hoppers 34 which normally urge plungers 39 in an upward direction.

To briefly describe a sorting as accomplished by the apparatus just described without reference to various control features to be described hereinafter, a stack of elements 10 are positioned in any one of stations 25 in group A, say the "0" station. Track section 35 is then moved to a position which permits fingers 27 on chain 26 to remove elements 10 successively from "0" station onto track section 36. The fingers on chain 32 move the elements past selecting station 30 to a position in which fingers 29 of chain 28 move elements 10 over the stations of group B. The code read by selecting station 30 is memorized electronically and in proper timed relation the proper track member 35 in group B is moved to a position for receiving the element in accordance with its code. When all the elements in "0" station have been distributed to the stations of group B, the first sorting has been completed. The elements are then removed successively and in an order reversed from that in which they are received by the stations from either "0" station through "9" station or "9" station through "0" station depending on whether the sorting is to be in descending or ascending order. Accordingly, each element is moved past selecting station 31 and the elements in group B are redistributed in group A. As noted hereinbefore, the third sorting made from group A to group B is made in reverse order of stations from that of the sortings from group B to group A because the elements are not restacked after each sorting.

In Fig. 3 an embodiment is shown in which the stations of group A comprise a single master station 40 and only a single selection station 41 is utilized between the stations. The track sections 42 and 43 connecting station 40 with the ends of stations 25 in group B are fixed with respect thereto to provide a closed path of movement for the elements. In this instance, the elements to be sorted are stacked in master station 40, removed therefrom, moved past selecting station 41, and delivered to the stations in group B in accordance with the code on each element. The elements are then removed successively from "0" station through "9" station to master station 40, or in a reverse order depending on the order of sorting desired, before the next sorting is made. While the arrangement disclosed in Fig. 3 provides for movement of the elements in a closed path and in the same direction, the same result can be attained by aligning station 40 with stations 25 of group A and placing selecting station 41 therebetween, the elements in this arrangement will then be moved in a straight line and the translating means will have to be reversible in order to restack the elements in station 40 after each sort.

In Figs. 5–7 and 10 another embodiment of the invention is disclosed in which stations 25 are arranged in two groups A and B about a vertical axis with selecting stations 50 and 51 arranged between said groups. Each of stations 25 comprises hopper 34 and movable track members 35, fixed track members 52 being arranged between each of the stations to provide a continuous circular track. Track members 35 comprise an upper lip 53 and an intermediate lip 54 formed integral with the member to provide a recess 55 on each side of members 35 in which elements 10 are moved. In the normal position, recesses 55 are aligned with similar recesses 56 in fixed members 52 and provides the continuous circular track 57. Each of track members 35 contains a second recess 58 directly below that of recess 55 which, when aligned with recess 56 in a manner to be described, prevents element 10 from entering recess 55. An aperture 59 in the bottom of each member 35 is of a size only slightly larger than that of the elements and connects recess 58 with hopper 34. In this way alignment of recesses 55 and 56 permits each element to be moved over the stations and alignment of recesses 56 and 58 permits an element to be moved over aperture 59 for delivery to its respective hopper 34. Also, when apertures 56 and 58 are aligned, elements 10 may be removed from hoppers 34 into recess 56 for movement along track 57.

Figures 11, 12, 13:
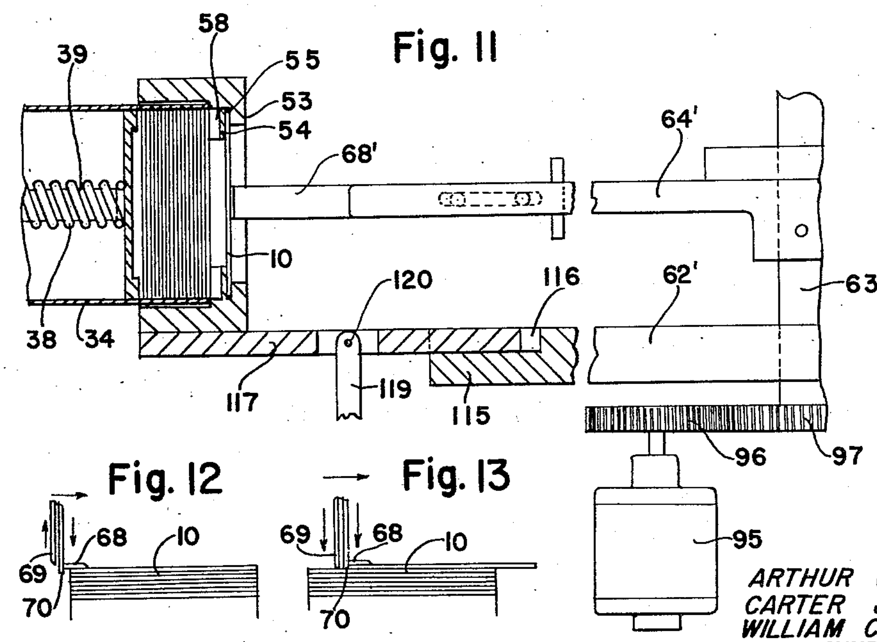
Figs. 12, 13 and 14 are diagrammatic views of various positions assumed by the pick-up and transporting fingers of the translating means.
Figure 14:
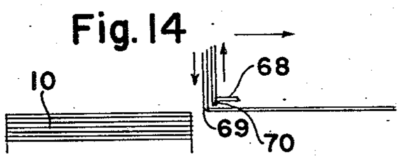

Each of track members 35 is carried on an arm 60 which is pivotally mounted as at 61 to a fixed plate 62 for vertical movement in a direction away from its hopper 34. Secured to a central drive shaft 63 and rotatable therewith is a webbed member 64 which has a number of forked arms 65 around its outer periphery equal in number to stations 25. Pivotally mounted in each of arms 65 at 66 and 67 are pick-up fingers 68 and carrying finger 69, respectively. As fingers 68 and 69 are rotated with respect to hoppers 34 for removing the elements from any one of said hoppers, finger 68 is first lowered by a cam, not shown, to a position as shown in Fig. 12 when over the fixed track member preceding the hopper from which the elements are to be removed and finger 69 is in a raised position. The heel 70 of finger 68 will then slide the uppermost element from the stack into recess 56. When finger 68 has been moved about one-half a card length, finger 69 is lowered and under a slight spring tension rests on the top of the element underneath the one being removed, see Fig. 13. As the forward motion continues, the element is completely removed from hopper 34 and into recess 56 of fixed member 52 and by the time the element has cleared the hopper, finger 69 has assumed a position for moving element 10 along track 57 and finger 68 has been retracted, as shown in Fig. 14. Finger 69 provides a safety factor which eliminates the need for relying wholly on heel 70 for removing the elements. The structure described comprises the translating means for the elements in this embodiment of the invention.

Figures 6, 7:
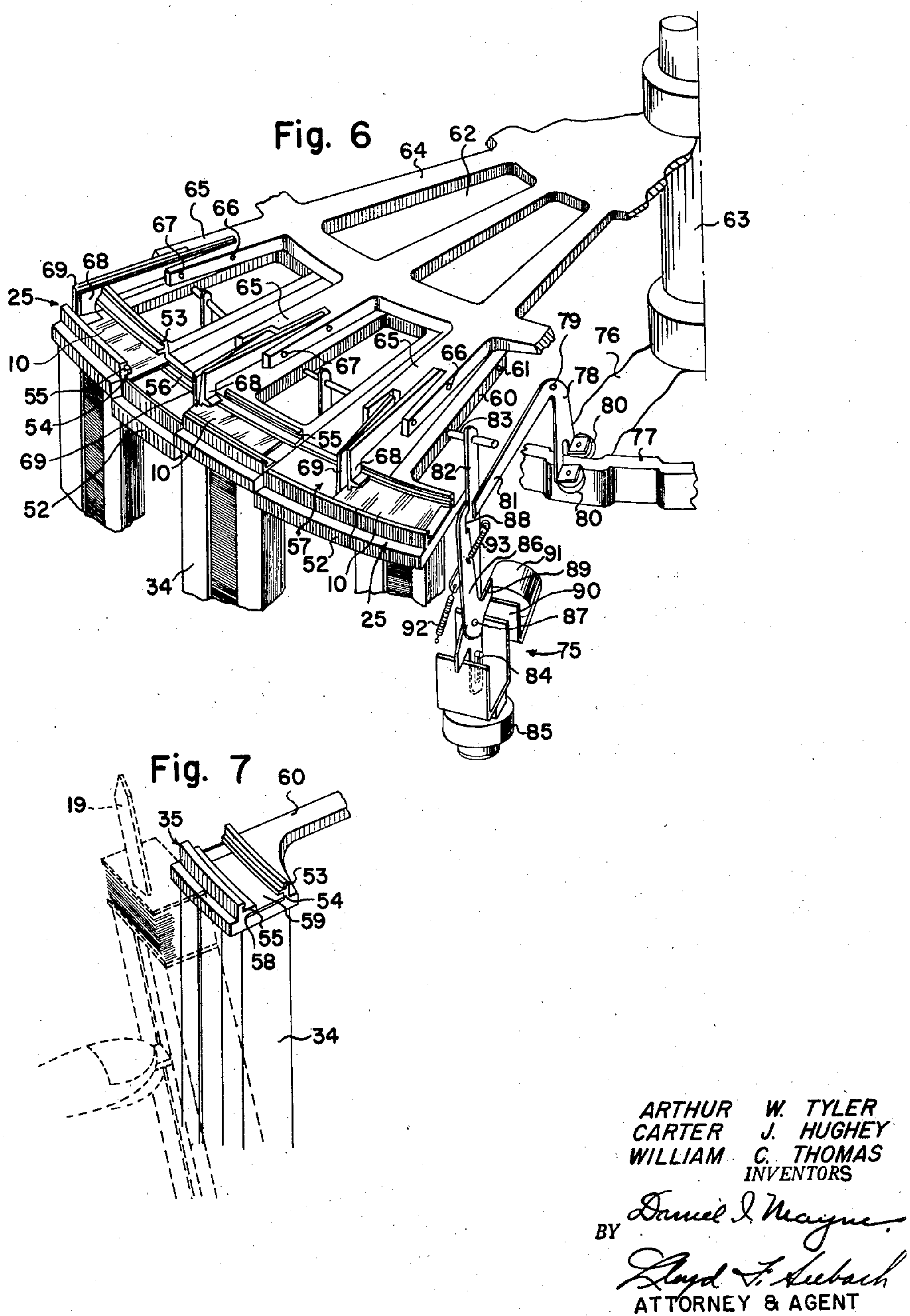
Fig. 6 is a partial perspective view of the embodiment shown in Fig. 5.
Fig. 7 is a detail view of a station showing the manner in which the elements are removed from and inserted into the stations.
Figure 10:
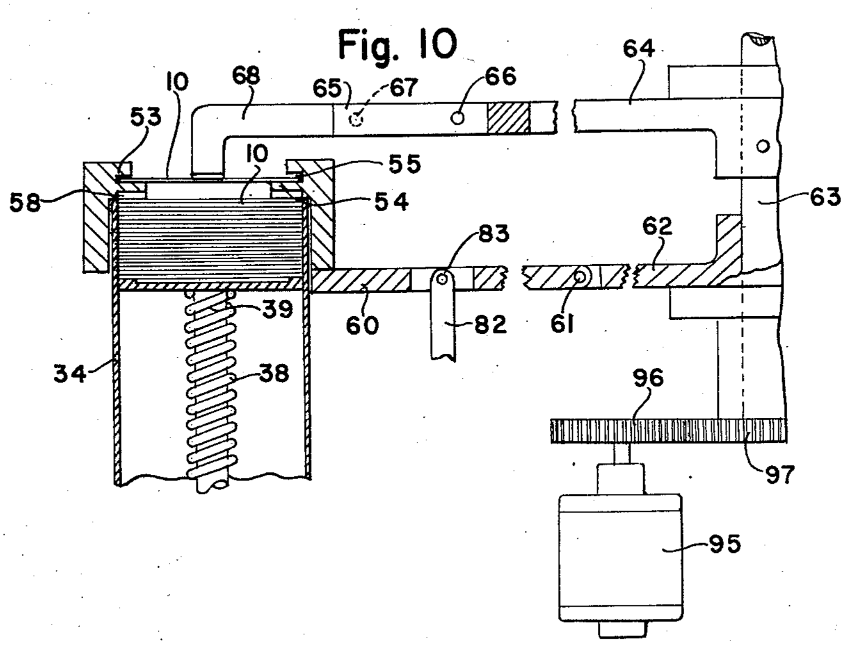
Figs. 10 and 11 are partial vertical sectional views showing the relation of the stations and translating means.

In order to permit elements to be removed from any one hopper in one group and to be delivered to any one hopper in the other group, movable track members 35 are raised to a position in which recesses 56 and 58 are aligned. This is accomplished by a linkage system 75, as shown in Fig. 6, which cooperates with the translating means and is operatively connected to and associated with the selecting means. Plate 76 is provided with a raised cam surface 77 and is secured to shaft 63 for rotation therewith, the arrangement of plates 62 and 76 with respect to each other being such that actuation of linkage system 75 is synchronized with the movement of element 10 along track 57. Bell crank lever 78 is pivotally mounted at 79 to a fixed bracket, not shown, and has followers 80 at one end thereof for engaging cam surface 77 to actuate the other end 81 of said lever. Link 82 is pivotally mounted at 83 to arm 60 and operatively connected at 84 to solenoid 85. Lever 86 is pivotally mounted on link 82 at 87 and has a notch 88 for engaging end 81 of lever 78. An extension 89 normally engages armature 90 of solenoid 91 to prevent engagement of notch 88 and end 81. Spring 92 maintains arm 60 in a position whereby recesses 55 and 56 are normally aligned, and spring 93 biases lever 86 toward end 81 of lever 78. When an element is centrally of the fixed track member preceding the station to which the element is to be delivered, solenoid 91 is energized to release extension 89 thereby permitting spring 93 to move lever 86 toward lever 78 so notch 88 latches onto end 81. Cam surface 77 then actuates lever 78 which raises lever 86 and link 82 to position recess 58 in alignment with that of recess 56 to allow the element to enter the hopper. When the element is completely in the hopper, the downstroke of end 81 lowers arm 60 and the element is stripped from finger 69 by lip 54. At the end of the downstroke lever 86 is unlatched from lever 78 when extension 89 engages armature 90 which has now been released. If successive elements are designated for the same station, solenoid 91 remains energized and arm 60 is raised and lowered for each of the elements. On succeeding sortings when the station is having elements removed therefrom, solenoid 85 is energized, thereby raising lever 82 and arm 60, lever 86 being held in its unlatched position by armature 90 of solenoid 91. As shown in Fig. 10, shaft 63 can be driven from motor 95 through gears 96 and 97 or directly by said motor.

Figure 8:
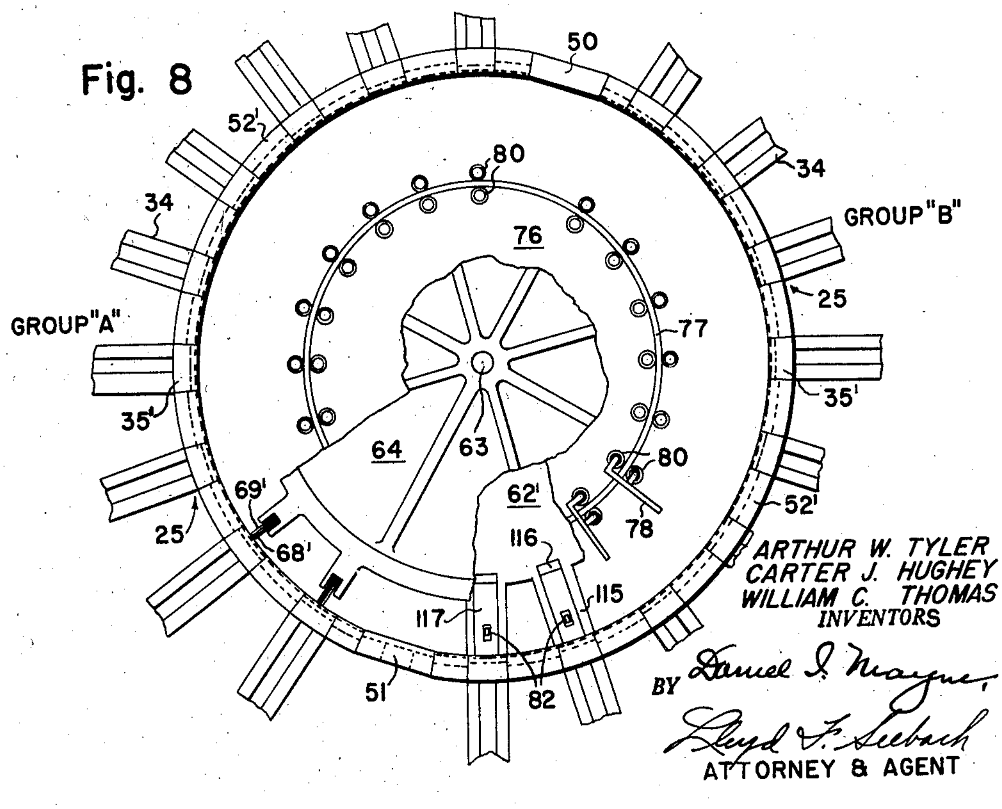
Fig. 8 is a plan view of another embodiment of the invention in which the groups of stations are arranged to provide a closed circular path of movement for said elements in a vertical plane.
Figure 9:
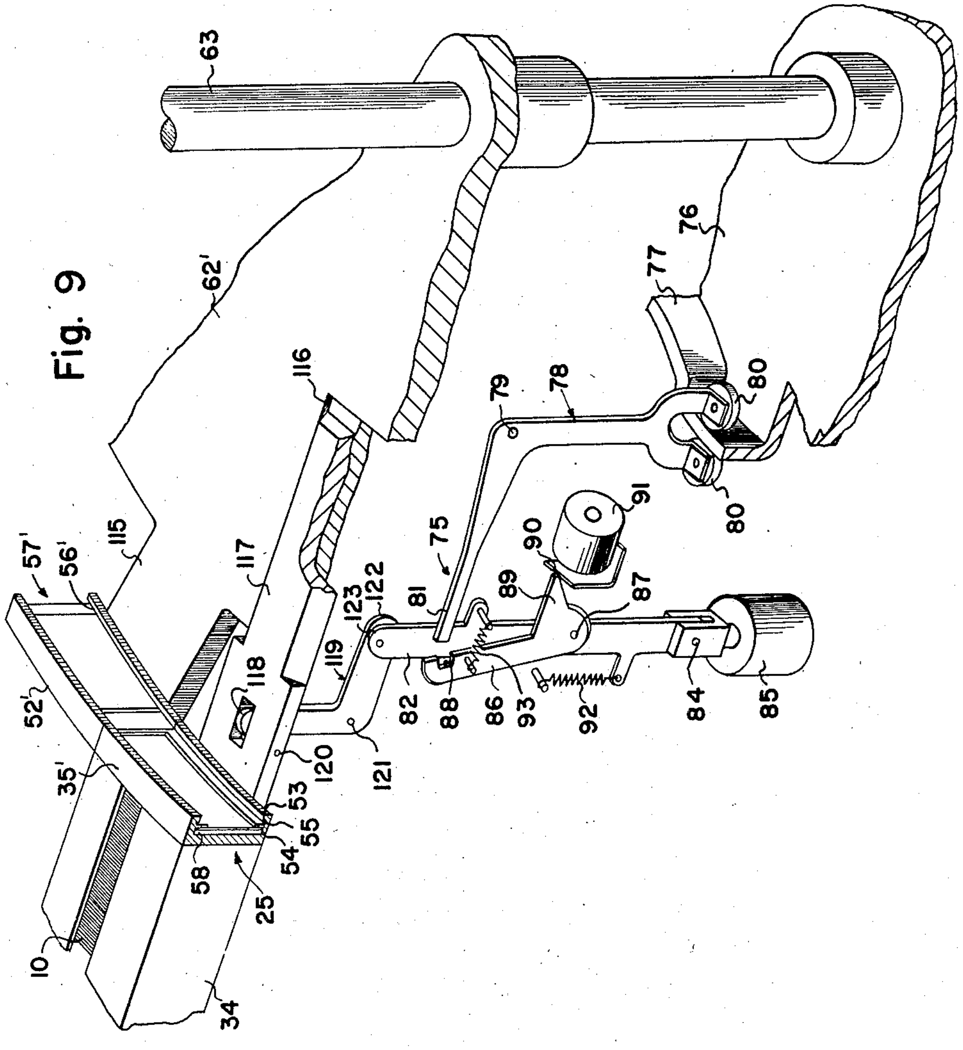
Fig. 9 is a partial perspective view of the embodiment shown in Fig. 8.

Figs. 8, 9 and 11 disclose another embodiment of the invention in which stations 25 are arranged in two groups about an axis and provide a path of movement for elements 10 in a vertical plane. From Figs. 9 and 11 it will be noted that elements 10 are stacked in a horizontal and radial direction. In this embodiment movable track member 35′ are moved radially to permit removal of elements 10 from any hopper and to deliver said elements to any one hopper. Likewise, fingers 68′ and 69′ are moved radially for removing and moving the elements along continuous circular track 57′ formed by alternate movable and fixed track members 35′ and 52′, respectively, in a manner similar to that of the embodiment just described. Plate 62′ is provided in this instance with arms 115 for supporting fixed track members 52′ and with a recessed way 116 in which plate 117 is movable. Plate 117 has track member 35′ fixed thereto and has an end 118 of bell crank lever 119 pivotally connected thereto at 120, lever 119 being pivotally mounted at 121, to a bracket on plate 62′ not shown. End 122 of lever 119 is pivotally connected to link 82 at 123, said link being actuated by means of levers 78 and 86 and solenoid 85 as described hereinbefore. As in the embodiment disclosed in Fig. 5, selecting stations 50 and 51 are arranged between the groups of stations and cooperate with the translating means.

Figures 15, 16:
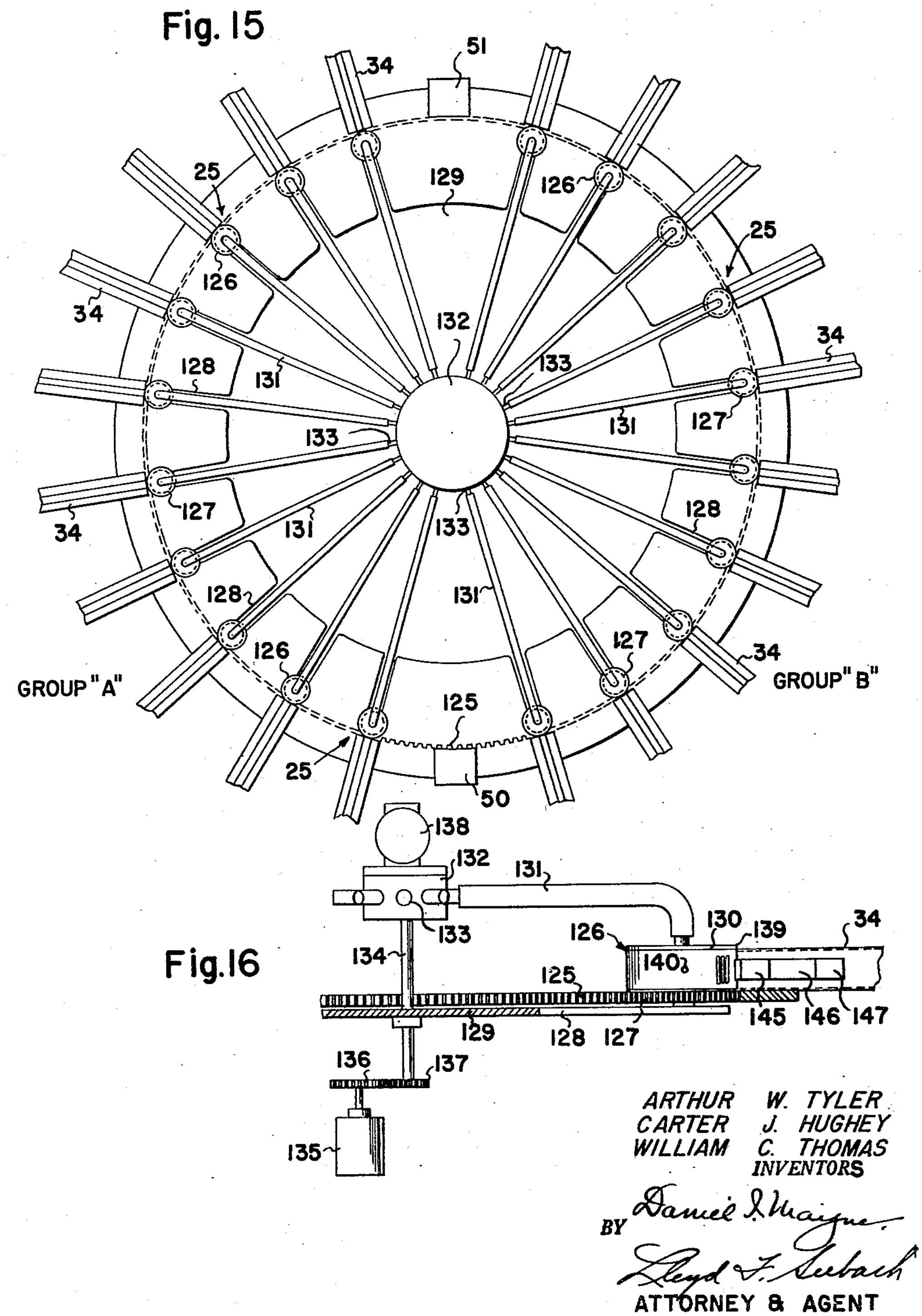
Fig. 15 is a plan view of another embodiment of the invention in which the groups of stations provide a closed circular path of movement for the elements in a vertical plane.
Fig. 16 is a partial side elevation of the embodiment disclosed in Fig. 15.

Figs. 15–18 disclose still another embodiment of the invention in which stations 25 are arranged about an axis to provide a circular path of movement for elements 10 in a vertical plane and in which said elements are stacked radially as in the previously described embodiment. Stations 25 are arranged radially over internal gear 125. In this embodiment elements 10 are moved from any one station in one group to any one station in the other group by carriers 126 comprising a gear 127 rotatably mounted on each arm 128 extending radially from plate 129, as shown in Fig. 15, and a hollow cylindrical housing 130, each of which is connected by a flexible pipe 131 to central chamber 132. The central chamber 132 is provided with outlets 133 in accordance with the number of stations and is rotated with plate 129 secured to shaft 134 by means of motor 135 through gears 136 and 137.

An evacuating pump 138 is positioned above chamber 132 and through chamber 132 and pipes 131 creates a suction in each of housings 130 at the louvres 139 and aperture 140. The spacing between louvres 139 and aperture 140 is such that one end of element 10 is held by the suction at the louvres and the other end is held by the suction at the aperture. As in the previously described embodiments, selecting stations 50 and 51 are positioned between the groups of stations, as shown in Fig. 15. The distance between stations 25 and the distance between the selecting stations and the stations on either side thereof is equivalent to the circumference of housings 130 in the film plane. In this way, one revolution of housings 130 will permit an element to be removed from any one hopper and to be delivered to the very next hopper or any other hopper, since the spacing of the stations is equal and is therefore a multiple of the circumference of housing 130.

Figures 17, 18:
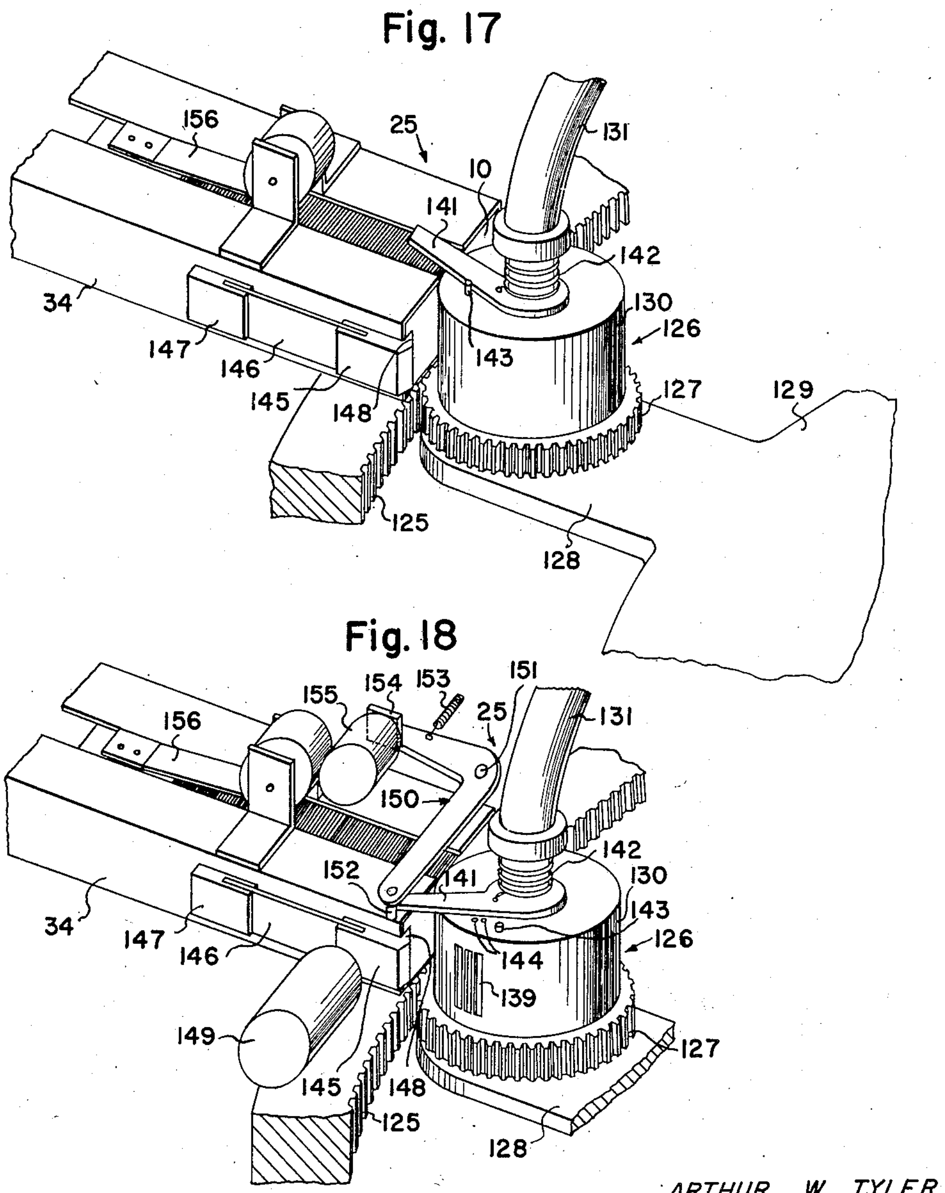
Figs. 17 and 18 are detail perspective views of a pneumatic translating means for removing and delivering said elements to their respective stations.

The outermost element in any hopper 34 is tangent to the circumference of housing 130. Since the length of elements 10 is relatively small, the space between the surface of the element to be removed from the periphery of housings 130 of the extremities of the element is also relatively small. As a result, each of housings 130 is positioned with respect to stations 25 so that louvres 139 and aperture 140 are adjacent the ends of the element and the application of suction from pump 138 sucks the element to housing 130 where it is maintained in position by the suction. The element is then moved with housing 130 as carrier 126 is rotated due to the movement of plate 129 and gear 127 with respect to fixed gear 125, the elements being moved along an epicycloidal path within gear 125. As the element is rotated past one of the selecting stations the code is read and a memory circuit retains the station number until the element is aligned with the respective station. As shown in Figs. 17 and 18, an arm 141 is freely mounted on each of housings 130 and biased by spring 142 against a pin 143 in which position arm 140 covers apertures 144. Apertures 144 connect the inner chamber of housings 130 with the atmosphere and when elements are being moved by said housings and cover louvres 139 and aperture 140, apertures 144 are covered by arm 141 thereby maintaining the suction which holds the elements on housings 130. Positioned on each side of hoppers 34 are retaining clips 145 which are secured to leaf springs 146 mounted in members 147 fixed to the side walls of said hoppers, see Figs. 17 and 18. Nose 148 of clips 145 retains elements 10 in the hoppers. Solenoids 149, when energized, move clips 145 sufficiently to permit said elements to be removed or delivered to the hoppers. A bell crank lever 150 is pivotally mounted above each of hoppers 34 at 151 and carries at one end thereof a pin 152 which is normally maintained in a position out of the path of arms 141 by spring 153. The other end 154 of lever 150 is actuated by solenoid 155 when energized to move pin 152 into the path of arm 141.

As elements 10 are being removed from any one hopper 34, solenoid 149 remains energized to permit successive elements to be readily removed. As elements 10 are delivered to any one hopper in the other group in accordance with the code, memory system 110 energizes solenoids 149 and 155 in proper timed relation to the positioning of element 10 in alignment with hopper 34 so that clips 145 are withdrawn from their retaining position and pin 152 causes arm 141 to be moved to position in which apertures 144 are uncovered thereby breaking the suction and releasing element 10 from carrier 126 for delivery to the hopper. Although the peripheral surface of housing 130 has been described as being tangent to the outermost element in the hoppers, it has been found that delivery of the elements is most successful if the stack of elements is moved radially a slight amount by housing 130 against the action of the coiled follower spring 156. The recovery of spring 156 is slow enough to permit carrier 126 to position the element in the hopper and clips 145 to assume their retaining position before the element delivered is urged by spring 156 against nose 148 of clips 145.

The selecting means for determining the order of the stations from which the sort is to be made and the station to which each element is to be delivered is shown in Figs. 1 and 19–24. With particular reference to Fig .1, section 100 discloses those elements associated with the sensing or reading stations 30, 31, 50 and 51 positioned between and/or with respect to said stations, section 101 includes those elements utilized in the sorting function for determining from the code on each element the hopper into which each element is to be delivered by the translating means, section 102, 103, and 104 comprise those elements providing control, timing and sequence for the signals derived from the element in the reading station and transmitted to section 101 for the sorting function, and section 105 comprises the various controls associated with the machine or translating means for determining the character starting the sort, the character determining the finish of the sort, the section in which the sort is to start, etc., as will be more fully described hereinafter.

Figure 19:
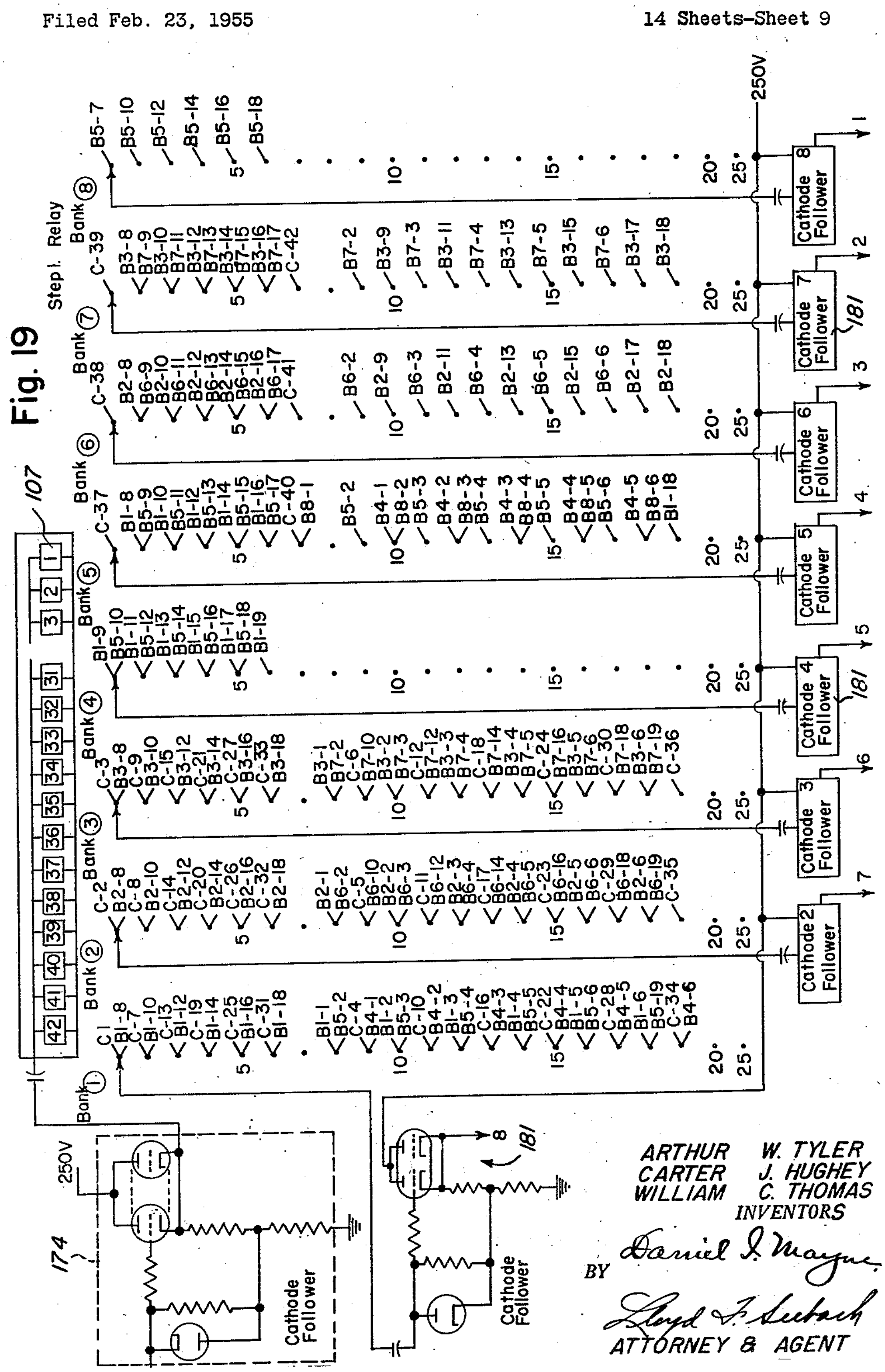
Fig. 19 is a detail wiring diagram of the circuits associated with reading station.
Figure 20:
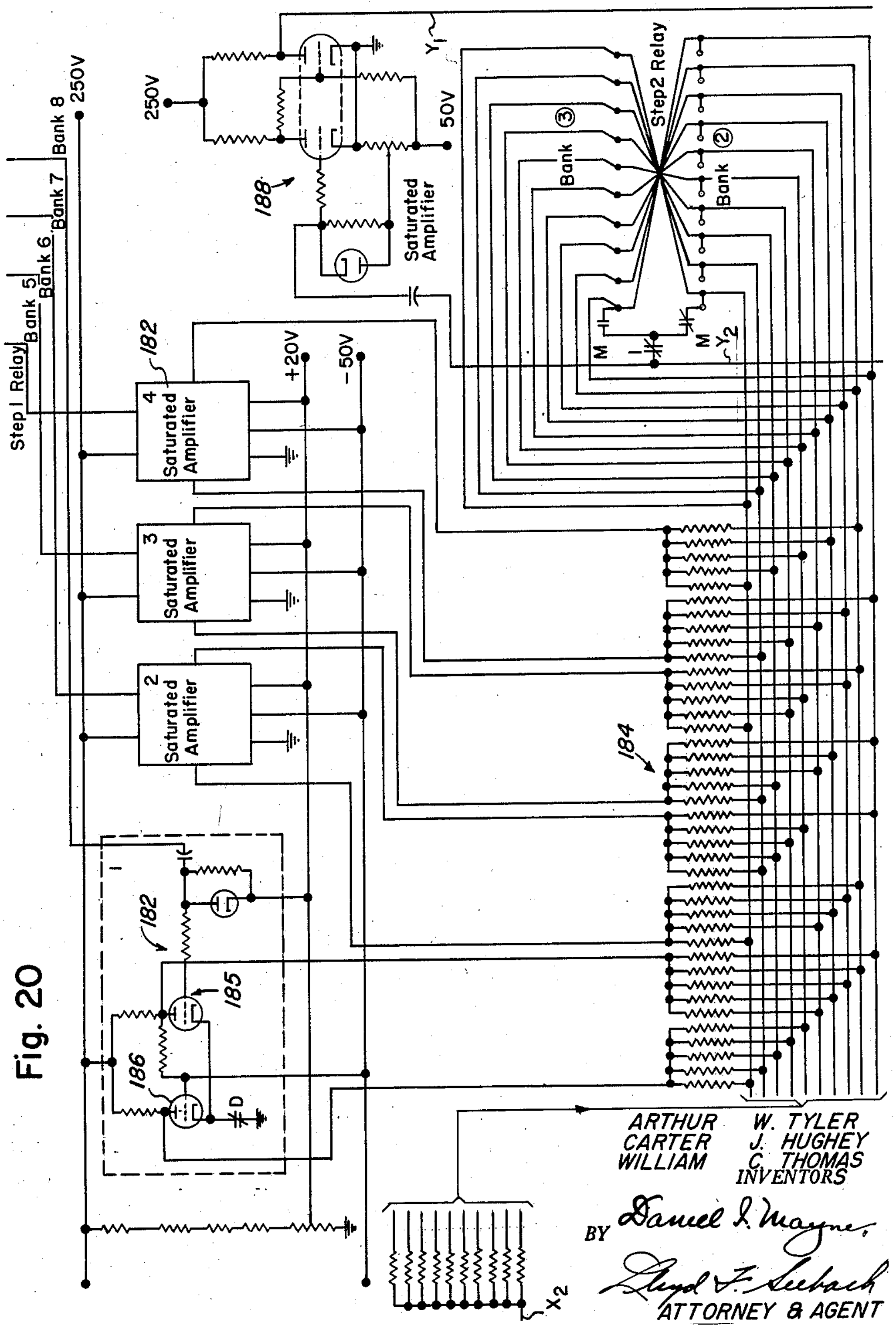
Fig. 20 is a detail wiring diagram of the character selector and check matrix circuits.
Figure 21:
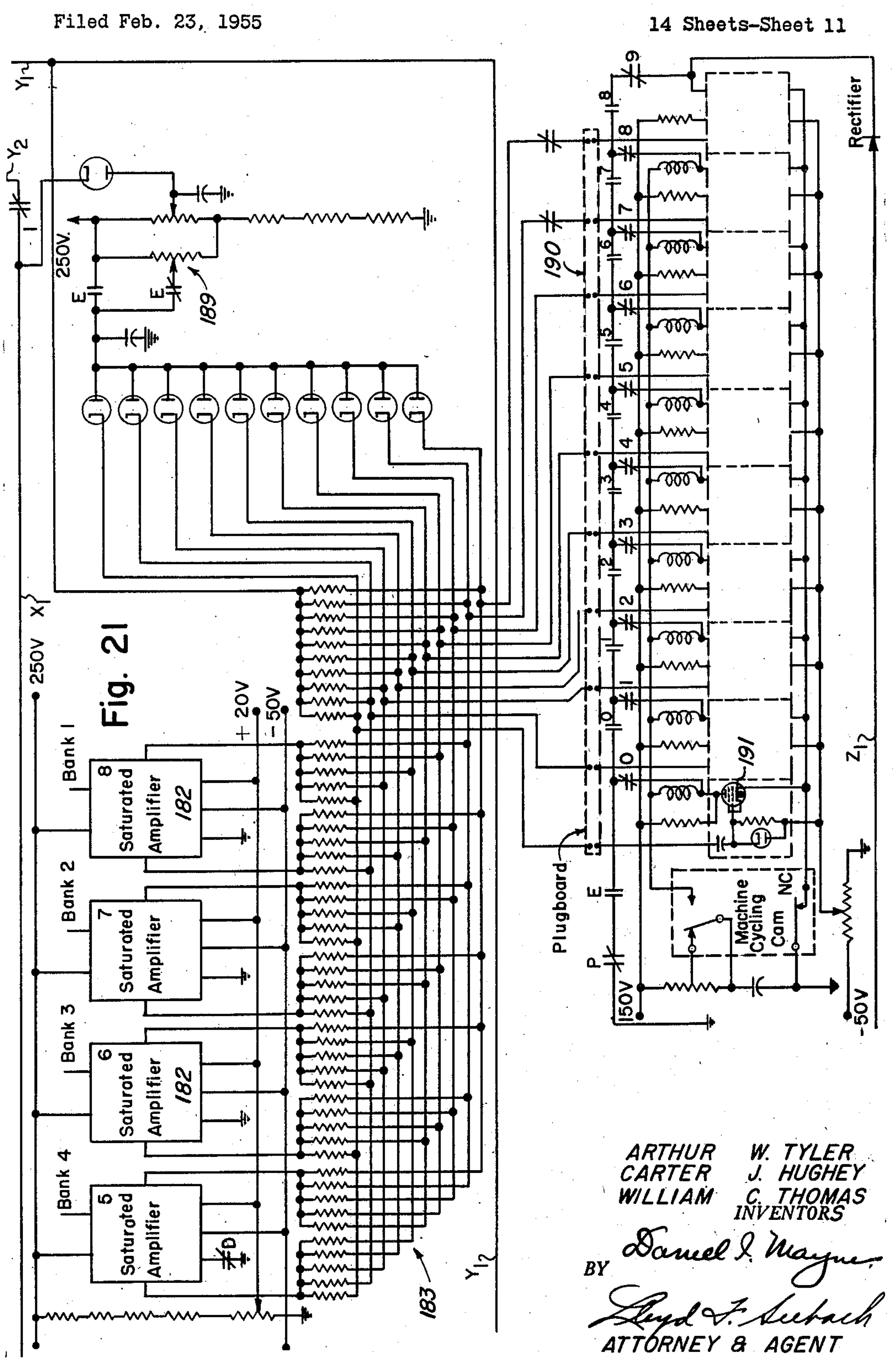
Fig. 21 is a detail wiring diagram of the sorting matrix, magazine memory and associated circuits.

As shown in Fig. 1, determination of the code is by transmission of light as from a source 106 through element 10 to a group of light-sensitive elements or photocells 107 in a well-known manner, the optical system having been omitted for clarity. It is to be understood that a reflection type of system for determining the code can also be used. The code can be either a four or six binary code which will permit coding of the numerals zero through nine or each letter of the alphabet and the numerals zero through nine, respectively. In Fig. 19 the light responsive members or photocells 107 are shown as including forty-two such elements, thirty-six being utilized for the information code and the remaining six being provided for control purposes and end-around checking.

Figure 24:
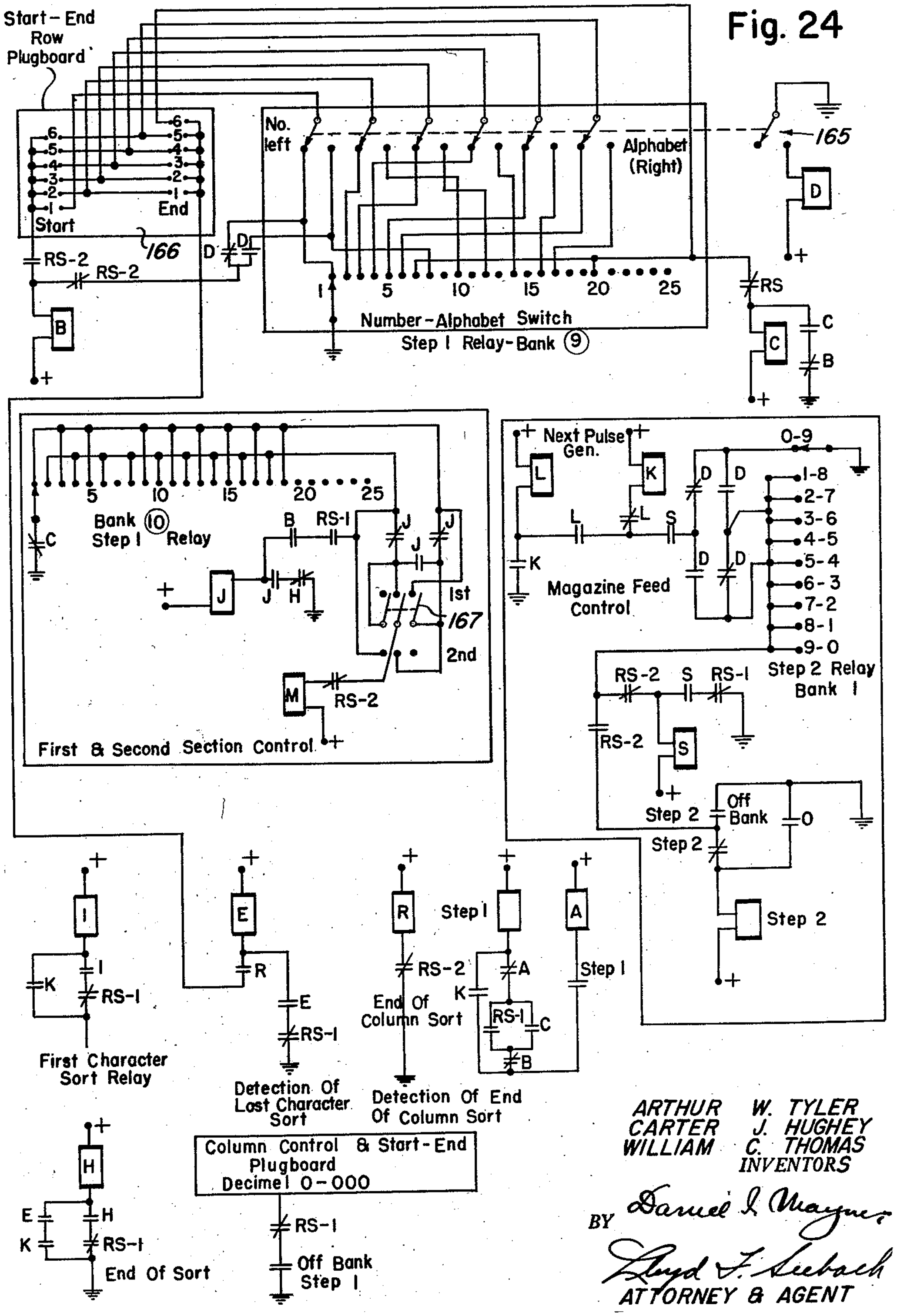
Fig. 24 is a detail wiring diagram of the circuits associated with the machine control.

The order of sort and whether the sort is to be numerical or alphabetical necessitates a control for the magazine feed and the section, depending on whether the sort is to be odd or even. Such controls are shown in Fig. 24. The position of switch 165 determines whether the sort is to be numerical or alphabetical and also the condition of relay D. Since a six bit binary code is utilized, six characters can be represented across each row of thirty-six code bits. As a result, board 166 must be plugged in accordance with the start and end of the sort, i. e., the sort can be plugged for any one character, for all six characters, or for any number of consecutive characters. With the positioning of switch 165 to determine the type of sort and the plugging of board 166 to determine the start and end of the sort, the connections to bank 9 of step 1 relay are completed. The section of the sorter in which the sort is to start is determined by the position of the three pole double-throw switch 167. When in the first position switch 167 causes relay J to pick up, if the point at which step 1 relay stops is even. Relay M then picks up on odd contacts of step 1 relay. If the point at which step 1 relay stops is odd, relay J stays down and relay M then picks up on even contacts of step 1 relay. In the second position of switch 167, the function of relay M is reversed, i. e., it picks up even on even and odd on odd with respect to step 1 relay. The homing point of step 2 relay, which homes in absence of ground whereas step 1 relay homes in presence of ground, is determined by position of switch 165.

Relay A plus step 1 relay determines the stepping rate. Upon pushing reset button 168, see Fig. 22, relay RS–1 is energized closing contacts RS–1 in the circuit of step 1 relay which results in energization of relay A with closure of the step 1 contact. Step 1 relay steps until interrupted by relay B which is picked up by the row-start sorting position as determined on board 166.

Figure 22:
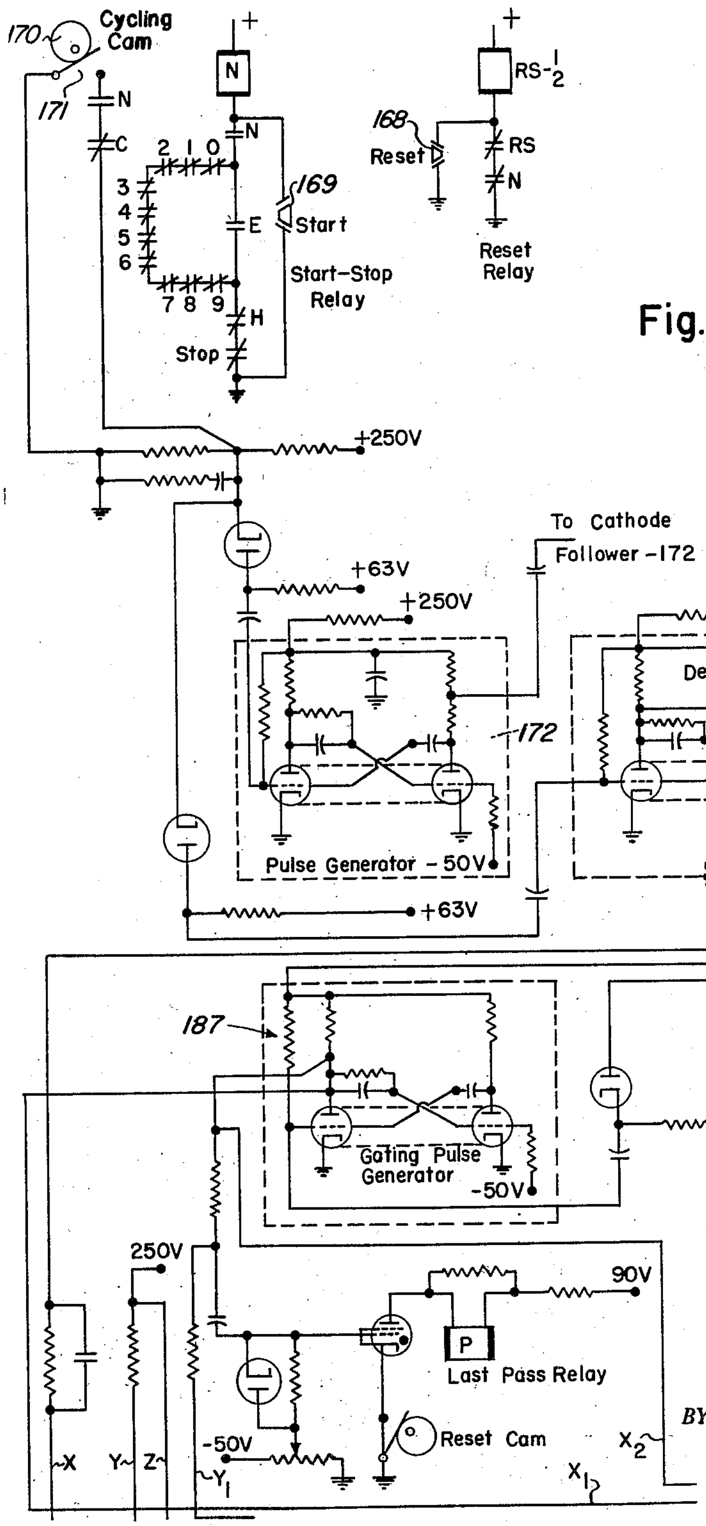
Figs. 22 and 23 are detail wiring diagrams of the control circuits utilized in conjunction with the circuits of the reading station and sorting function.
Figure 23:
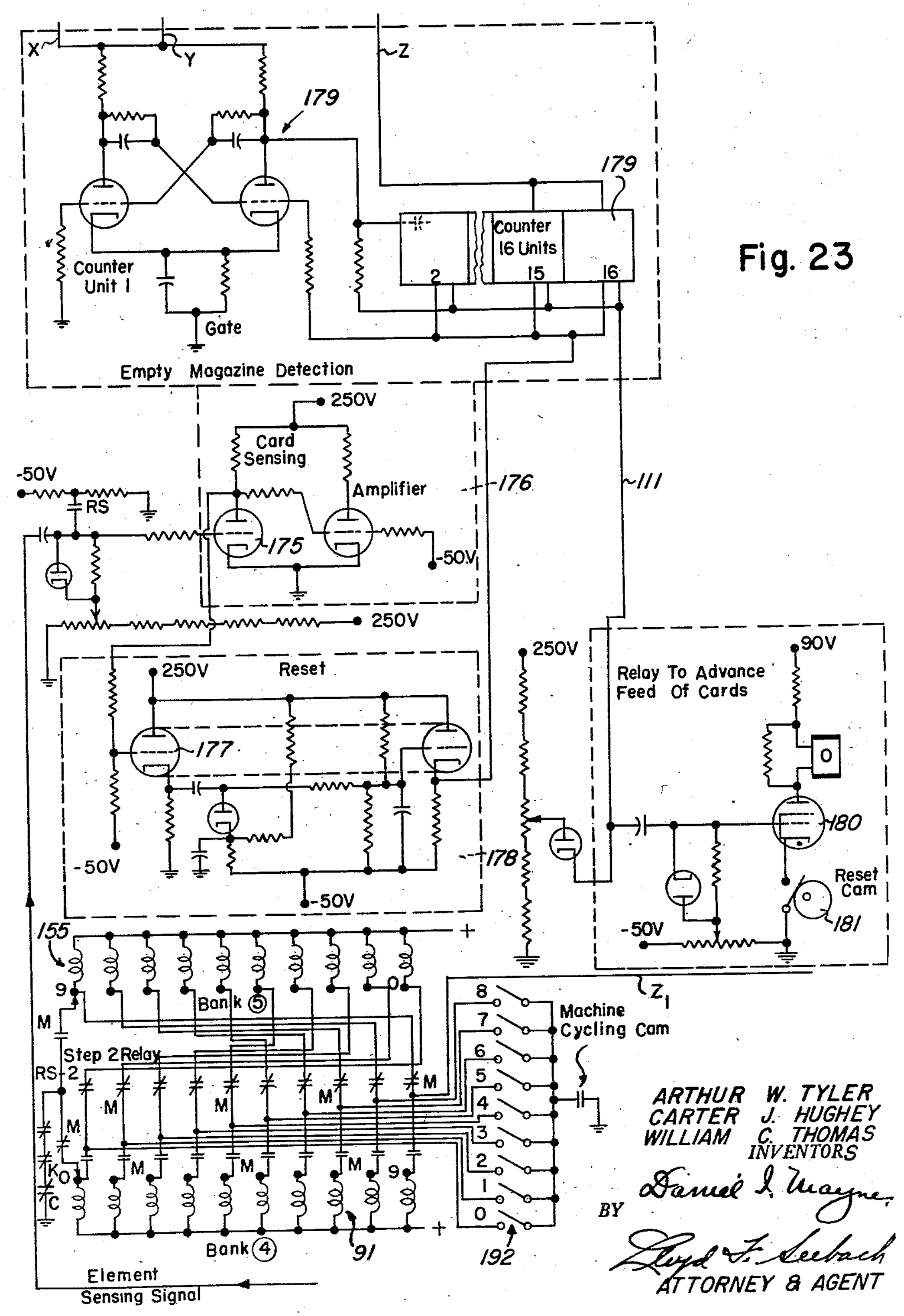

Upon closure of start switch 169, see Fig. 22, relay N is energized thereby pulling in its contacts N which hold relay N in and permit cycling cam 170 to intermittently close switch 171 for producing a pulse in phase with the machine cycle and which is transmitted to the pulse generating circuit 172 and to delay circuit 173, the delay circuit allowing time for transients to die out. Circuit 172 applies a pulsed voltage across cells 107 through cathode follower circuit 174 and provides a satisfactory signal to noise ratio which allows the cells to be used within their dissipation rating.

As an element is moved into the reading station, a signal is derived therefrom which is transmitted to the grid of tube 175 in amplifier circuit 176. The amplified signal therefrom is transmitted to the grid of tube 177 in reset circuit 178 which provides an output pulse to counter circuits 179, thereby causing said circuits to reset. Counter circuit 179 comprises sixteen stages, see Fig. 23, only one of which is shown in detail, and provides four in excess over the necessary twelve which permit an element from the farthest station to reach the reading station or permit delivery of an element to the farthest station. The output from the last stage of counter 179 is transmitted to the control grid of thyratron 180 which when fired results in the energization of relay O. Reset cam 181 which is synchronized with the machine cycle reconditions tube 180. Reset circuit 178 is an isolation and low impedance device which resets counter 179 as long as successive elements are moved into the reading station. Hence, when the last element in the feeding magazine is sensed, counter 179 counts out after fifteen elements or machine cycles and the energization of relay O closes its contact in the circuit of step 2 relay causing it to advance one step and switching the feed to the next magazine or station. Counter 179 is again reset by the next element moved into the reading station and is continually reset by each successive element.

Step 1 relay is a stepping relay and comprises ten banks, eight being used in conjunction with the cells 107, one being used for number-alphabet sort and the other being used for section control, see Figs. 19 and 24. With reference to Fig. 19, it will be noted that the bank contact positions have been divided into two sections: the upper section (contacts 1–6) controls the character switching for numerical sorting (six characters per row) and the lower section (contacts 8–20) controls the switching for alphabetic sorting (six characters per row, each character being broken into two three bit groups) hence, the need for twelve contact positions. For numeric sorting only four of the six code bits are used per character and the elements, if in the first section, are fed from magazine 0 through 9 and, if in the second section, are fed from magazines 9 through 0. For an alphabet sort, as noted above, each character comprises two three bit groups and, as a result, two sorts are made for each character. In each type of sort, however, a comparison check of the previous code structure is made. If the sorting is alphabetic, the elements are fed from the first section (even sort) for magazines 5 through 7 and 0 through 4 and in the second section from magazine 4 through 0 and 7 through 5.

The eight banks of step 1 relay are also divided into two groups, as well as the contacts, banks 1 through 4 being associated with the sorting function whereas banks 5 through 8 are used in conjunction with the check comparison. The designations adjacent the contacts of each bank indicate the connections made thereto. For example, in the first bank the first contact carries C1 and B1–8 which indicates that this contact is connected to the first cell of 107 and to contact 8 of bank 1. By tracing the various connections, it will be found that each contact is connected to one of cells 107. The first contact in each bank is connected to the following cells: bank 1-cell 1, bank 2-cell 2, bank 3-cell 3, bank 4-cell 4, bank 5-cell 37, bank 6-cell 38, bank 7-cell 39 and bank 8-cell 40. The second contact in each bank is connected to cells 7, 8, 9, 10, 1, 2, 3 and 4, respectively. It is to be noted that cells 1, 2, 3, and 4 are connected to banks 1–4 with respect to the first contact and to banks 5–8 with respect to the second contact. This same procedure follows for the first six contacts and provides a check with respect to the previous character sort. Since a numeric sort requires only four bits of code, the first four cells of each group of six are used. As a result, in the case of the first contact, cells 5 and 6 are not connected into the first contact and for the same reason cells 11, 12, 17, 18, 23, 24, 29, 30, 35 and 36 are not connected to contacts 2–6. At the end of the sort for each character, step 1 relay is stepped to the next contact. The contacts of banks 5, 6 and 7 in the seventh step are connected to cells 40, 41 and 42 which with cells 37, 38 and 39 connected to the first step provide an end-around check when step 1 relay is in its first position or upon completion of the sixth character sort which completes one row of code. In other words, only the first seven contacts of step 1 relay are utilized for a numeric sort.

In the case of an alphabetic sort, contacts 8–19 or a total of twelve contacts are used. If the various connections are traced, it will be found that contact 8 is connected to cells 1, 2 and 3 in only the first three banks and that only banks 1, 2, 3, 5, 6 and 7 are used in an alphabetic sort, banks 1, 2 and 3 being used for the sort and banks 5, 6 and 7 providing the check against the previous sort. In the alphabet sort, therefore, two sorts are required for each character, hence, the necessity for twelve contact positions. As a result, a numeric sort will provide a sort output signal to the wiper arms of banks 1–4 in accordance with the different combination of cells actuated by the code on the element and a check sort output signal to the wiper arms 5–8. However, in the alphabetic sort only banks 1–3 will provide a sort output signal. It is to be understood, of course, that while a sort is confined to one character, whether numeric or alphabetic, the entire row of code is illuminated but step 1 relay connects in only those cells associated with the character being sorted.

Each of the wiper arms associated with banks 1–8 of step 1 relay are connected to a cathode follower circuit 181, the output of which is transmitted to its respective amplifier circuit 182 associated with the sort matrix 183 or check matrix 184. One of amplifier circuits 182 is shown in detail in Fig. 20. The cell signal on bank 8 wiper arm is transmitted through cathode follower circuit 181 to the saturated grid of tube 185, the grid then being driven to cut-off. The plate of tube 185 is direct coupled to the grid of tube 186. Hence, two output leads, one potential being determined by plate saturation and the other potential being determined by cut-off conditions, exist per cell. The plate outputs of amplifier circuits 182 are connected to sort matrix 183 or check matrix 184. Both matrices are of a resistance type which mix or translate the plate potentials to one of ten output lines corresponding to the incoming excess three binary code signals. The output of check matrix 184 is applied to either bank 2 or 3 of step 2 relay, the position of switch 167 determining which of relay M contacts are open or closed. This output signal after the first character sort or that of gating pulse generator 187 for the first character sort is applied to a grid of the saturated amplifier 188 and the output of 188 is applied to the sort matrix 183. The output referenced to network 189 from sort matrix 183 is connected via plug board 190 and to the thyratron 191 associated with the magazine which is to receive the element as determined from the character. When the thyratron is fired, the solenoid in its plate circuit is energized, thereby setting a mechanical memory, not shown, which serves to actuate the proper switch at 192 to energize the coil of the proper solenoid 91 or 155 or solenoids 85 or 149, Figs. 6 and 18.

By connecting the output of check matrix 184 to the ten contacts of banks 2 and 3 of step 2 relay, a comparison between the previous character sort and the magazine feeding the element is accomplished. As a result, a one to one correspondence exists because the check matrix output wiper arm connects to the same level as the magazine feed wiper arm. With respect to the connections made between banks 1–8 of step 1 relay, it will be evident that on the first character sort, whether numeric or alphabetic, no comparison is made and on the last machine pass when the elements are placed in one section only a check comparison is made.

Upon completing the sortation of the characters of one row, relay C picks up, locks up on relay B and causes step 1 relay to travel to the beginning point of the row when relay B again picks up, interrupting step 1 relay and releasing relay C. The end of the complete character sort is determined by the coincidence of the last character of a column and the column containing the character. This coincidence causes relay E to pick up. Upon the last machine pass when the elements are stacked into the section, relay P is actuated whenever a check comparison is incorrect. Relay P opens the feed contacts, Fig. 21, associated with the receiving section. When step 2 relay has fed all the magazines (end of character sort) a pulse is generated by relays K and L which advances step 1 relay, relay I and relay H. The functions of the various other relays and circuits are believed to be self-explanatory and relate primarily to switching controls.

In each of the described embodiments of the invention, it is apparent that the stations, irrespective of their arrangement must be capable of having elements removed therefrom and delivered thereto by the translating means, since the operator only handles the elements to place them in the sorter and to remove them from the sorter at the end of the final sorting. With the exception of the last described embodiment, stations 25 in each of the embodiments are substantially the same, the movable track members 35 being actuated by linkage 75 which is controlled by the selecting means. While the translating means is disclosed as being continuous, it is conceivable that an intermittent type of movement is also possible, thereby permitting the selecting means to determine the code at the instant the elements are stationary. The selecting means described in conjunction with Figs. 1 and 19–24 is understood to be applicable to any of the embodiments disclosed. Also, such a selecting means for determining from the code on each element the respective station to which the elements are to be delivered can comprise other arrangements of circuits to obtain the same results.

Since many other modifications and applications of the invention will be suggested and apparent to those skilled in the art, the scope of the invention is defined in the appended claims.

Having now particularly described our invention, what we desire to secure by Letters Patent of the United States and what we claim is:

1. A device for moving a plurality of elements having a code thereon with respect to a plurality of stations for sorting said elements, comprising at least two groups of stations, the stations in each of said groups being adapted to receive elements having a designated code and to have said elements removed therefrom, translating means arranged with respect to said stations for removing said elements from any one of said stations and delivering said elements to any one of said other stations, and selecting means cooperating with said translating means and responsive to the code on said elements for determining the station from which said elements are to be removed and the stations to which said elements are to be delivered.

2. A device for moving a plurality of elements having a code thereon with respect to a plurality of stations for sorting said elements, comprising at least two groups of stations, the stations in each of said groups being adapted to receive elements having a designated code and to have said elements removed therefrom, translating means arranged with respect to said stations for removing said elements from any one of said stations in one of said groups and delivering said elements to any one of said stations in the other of said groups, and selecting means cooperating with said translating means and responsive to the code on said elements for determining the station in said one group from which said elements are to be removed and the stations in the other of said groups to which said elements are to be delivered.

3. A device for moving a plurality of elements having a code thereon with respect to a plurality of stations for sorting said elements, comprising at least two groups of stations, the stations in each of said groups being adapted to receive elements having a designated code and to have said elements removed therefrom, translating means arranged with respect to said stations for removing said elements from the stations of any one group in an order reversed from that in which said elements were received by said stations and delivering said elements to said stations in the other of said groups, said groups alternately having said elements removed therefrom and delivered thereto until the number of sortings is in accordance with the code on said elements, and selecting means cooperating with said translating means and responsive to the code on said elements for determining the station from which said elements are to be removed and the stations to which said elements are to be delivered.

4. A device for moving a plurality of elements having a code thereon with respect to a plurality of stations for sorting said elements, said stations being adapted to receive elements having a designated code thereon and to have said elements removed therefrom, comprising translating means arranged with respect to said stations for removing said elements from any one of said stations and delivering said elements to any one of said other stations, and selecting means cooperating with said translating means for determining the station from which said elements are to be removed and the stations to which said elements are to be delivered.

5. A device for moving a plurality of elements having a code thereon with respect to a plurality of stations for sorting said elements, comprising a group of stations, said stations being adapted to receive elements having a designated code and to have said elements removed therefrom, translating means arranged with respect to said stations for removing said elements from one of said stations and delivering said elements to any one of said other stations, and selecting means cooperating with said translating means and responsive to the code on said elements for determining the station from which said elements are to be removed and the stations to which said elements are to be delivered.

6. A device for moving a plurality of elements having a code thereon with respect to a plurality of stations for sorting said elements, comprising two groups of stations, the stations in each of said groups being adapted to receive elements having a designated code and to have said elements removed therefrom, translating means arranged with respect to stations for removing said elements from any one of said stations in one of said groups and delivering said elements to any one of said stations in the other of said groups, and selecting means arranged between said groups of stations and cooperating with said translating means and responsive to the code on said elements for determining the station in said one group from which said elements are to be removed and the stations in the other of said groups to which said elements are to be delivered.

7. A device for moving a plurality of elements having a code thereon with respect to a plurality of stations for sorting said elements, comprising two groups of stations arranged to define a closed path of movement for said elements, the stations in each of said groups being adapted to receive elements having a designated code and to have said elements removed therefrom, translating means arranged with respect to said stations for removing said elements from any one of said stations in one of said groups and moving said elements in said closed path for delivery to any one of said stations in the other of said groups, and selecting means cooperating with said translating means and responsive to the code on said elements for determining the station in said one group from which said elements are to be removed and the stations in the other of said groups to which said elements are to be delivered.

8. A device for moving a plurality of elements having a code thereon with respect to a plurality of stations for sorting said elements, comprising two groups of stations arranged in spaced parallel relation to define a closed path of movement for said elements, the stations in each of said groups being adapted to receive elements having a designated code and to have said elements removed therefrom, translating means arranged with respect to said stations for removing said elements from any one of said stations in one of said groups and moving said elements in said closed path for delivery to any one of said stations in the other of said groups, and selecting means arranged between said groups of stations and cooperating with said translating means and responsive to the code on said elements for determining the station in said one group from which said elements are to be removed and the stations in the other of said groups to which said elements are to be delivered.

9. A device for moving a plurality of elements having a code thereon with respect to a plurality of stations for sorting said elements, comprising two groups of stations arranged parallel to and equiangularly about the vertical axis of a cylinder to define a closed circular path of movement for said elements in a horizontal plane, the stations in each of said groups being adapted to receive elements having a designated code and to have said elements removed therefrom, translating means rotatable about said axis for movement over said closed path for removing said elements from any one of said stations in one of said groups and delivering said elements to any one of said stations in the other of said groups, and selecting means arranged between said groups of stations and cooperating with said translating means and responsive to the code on said elements for determining the station in said one group from which said elements are to be removed and the stations in the other of said groups to which said elements are to be delivered.

10. A device for moving a plurality of elements having a code thereon with respect to a plurality of stations for sorting said elements, comprising two groups of stations arranged equiangularly about a vertical axis to define a closed circular path of movement for said elements in a horizontal plane and for stacking said elements in a vertical direction, the stations in each of said groups being adapted to receive elements having a designated code and to have said elements removed therefrom, translating means rotatable about said axis for movement over said closed path and with respect to said horizontal plane for removing said elements from any one of said stations in one of said groups and delivering said elements to any one of said stations in the other of said groups, and selecting means arranged between said groups of stations and cooperating with said translating means and responsive to the code on said elements for determining the station in said one group from which said elements are to be removed and the stations in the other of said groups to which said elements are to be delivered.

11. A device for moving a plurality of elements having a code thereon with respect to a plurality of stations for sorting said elements, comprising two groups of stations arranged equi-angularly about a vertical axis to define a closed circular path of movement for said elements in a horizontal plane and for stacking said elements in a vertical direction, the stations in each of said groups being adapted to receive elements having a designated code and to have said elements removed therefrom, translating means rotatable about said axis for movement over said closed path and with respect to said horizontal plane for removing said elements from the stations of only one group in an order reversed from that in which said elements were received by said stations and delivering said elements to said stations in the other of said groups, said groups alternately having said elements removed therefrom and delivered thereto until the number of sortings is in accordance with the code on said elements, and selecting means arranged between said groups of stations and cooperating with said translating means and responsive to the code on said elements for determining the station in said one group from which said elements are to be removed and the stations in the other of said groups to which said elements are to be delivered.

12. A device for moving a plurality of elements having a code thereon with respect to a plurality of stations for sorting said elements, comprising two groups of stations arranged equiangularly about a vertical axis to define a closed circular path of movement for said elements in a horizontal plane and for stacking said elements in a vertical direction, said stations being adapted to receive elements having a designated code and to have said elements removed therefrom, a movable track member positioned over each of said stations, a fixed track member positioned between each of said movable track members, said fixed and movable track members being normally aligned to provide a continuous circular track for said elements and said movable track members being adapted to be moved to an unaligned position for permitting removal of and delivery to their respective stations of said elements, translating means rotatable about said axis for movement over said circular track to remove said elements from any one of said stations in one of said groups and to deliver said elements to any one of said stations in the other of groups, and selecting means arranged between said groups of stations and cooperating with said movable track members and responsive to the code on said elements for determining the movable track member in said one group to be moved to said unaligned position to permit said elements to be removed from its respective station and the movable track members in the other of said groups to be moved to said unaligned positions to permit said elements to be delivered to the respective stations.

13. A device for moving a plurality of elements having a code thereon with respect to a plurality of stations for sorting said elements, comprising two groups of stations arranged radially and equiangularly about a common axis to define a closed circular path of movement for said elements in a vertical plane, the stations in each of said groups being adapted to receive elements having a designated code and to have said elements removed therefrom, translating means rotatable about said axis for movement over said closed path for removing said elements from any one of said stations in one of said groups and delivering said elements to any one of said stations in the other of said groups, and selecting means arranged between said groups of stations and cooperating with said translating means and responsive to the code on said elements for determining the station in said one group from which said elements are to be removed and the stations in the other of said groups which said elements are to be delivered.

14. A device for moving a plurality of elements having a code thereon with respect to a plurality of stations for sorting said elements, comprising two groups of stations arranged equiangularly about a vertical axis to define a closed circular path of movement for said elements in a vertical plane and for stacking said elements in a radial horizontal direction, the stations in each of said groups being adapted to receive elements having a designated code and to have said elements removed therefrom, translating means rotatable about said axis for movement over said closed path for removing said elements from any one of said stations in one of said groups and delivering said elements to any one of said stations in the other of said groups, and selecting means arranged between said groups of stations and cooperating with said translating means and responsive to the code on said elements for determining the station in said one group from which said elements are to be removed and the stations in the other of said groups to which said elements are to be delivered.

15. A device for moving a plurality of elements having a code thereon with respect to a plurality of stations for sorting said elements, comprising two groups of stations arranged equiangularly about a vertical axis to define a closed circular path of movement for said elements in a vertical plane and for stacking said elements in a radial horizontal direction, the stations in each of said groups being adapted to receive elements having a designated code and to have said elements removed therefrom, translating means rotatable about said axis for movement over said closed path and with respect to said vertical plane for removing said elements in an order reversed from that in which said elements were received by said stations and delivering said elements to said stations in the other of said groups, said groups alternately having said elements removed therefrom and delivered thereto until the number of sortings is in accordance with the code on said elements, and selecting means arranged between said groups of stations and cooperating with said translating means and responsive to the code on said elements for determining the station in said one group from which said elements are to be removed and the stations in the other of said groups to which said elements are to be delivered.

16. A device for moving a plurality of elements having a code thereon with respect to a plurality of stations for sorting said elements, comprising two groups of stations arranged equiangularly about a vertical axis to define a closed circular path of movement for said elements in a vertical plane and for stacking said elements in a radial horizontal direction, the stations in each of said groups being adapted to receive elements having a designated code and to have said elements removed therefrom, a movable track member positioned with respect to each of said stations, a fixed track member positioned between each of said movable track members, said fixed and movable track members being normally aligned to provide a continuous track in a vertical plane for said elements and said movable track members being adapted to be moved to an unaligned position for permitting removal of and delivery to their respective stations of said elements, translating means rotatable about said axis for movement with respect to said continuous track for removing said elements from any one station in one of said groups in an order reversed from that in which said elements were received by said stations and delivering said elements to said groups in an order reversed from that in which said elements were received by said stations and delivering said elements to said stations in the other of said groups, said groups alternately having said elements removed therefrom and delivered thereto until the number of sortings is in accordance with the code on said elements, and selecting means arranged between said groups of stations and cooperating with said movable track members and responsive to the code on said elements for determining the movable track member in said one group to be moved to said unaligned position to permit said elements to be removed from its respective station and the movable track members in the other of said groups to be moved to said unaligned positions to permit said elements to be delivered to the respective stations.

17. A device for moving a plurality of elements having a code thereon with respect to a plurality of stations for sorting said elements, comprising two groups of stations arranged radially and equiangularly about a common axis to define a closed path for movement of said elements in a vertical plane, the stations in each of said groups being adapted to receive elements having a designated code and to have said elements removed therefrom, translating means rotatable about said axis and with respect to said stations for removing said elements from any one of said stations in one of said groups and for moving said elements in an epicycloidal path relative to said closed path to deliver said elements to any one of said stations in the other of said groups, and selecting means arranged between said groups of stations and responsive to the code on said elements for determining the station in said one group from which said elements are to be removed and the stations in the other of said groups to which said elements are to be delivered.

18. A device for moving a plurality of elements having a code thereon with respect to a plurality of stations for sorting said elements, comprising two groups of stations arranged radially and equiangularly about a common axis to define a closed path for movement of said elements in a vertical plane, the stations in each of said groups being adapted to receive elements having a designated code and to have said elements removed therefrom, translating means rotatable about said axis and with respect to said stations for removing said elements from any one of said stations in one of said groups and for moving said elements in an epicycloidal path relative to said closed path to deliver said elements to any one of said stations in the other of said groups, pneumatic means associated with said translating means for removing said elements from said one station and retaining said element on said translating means for delivery to the other of said stations, and selecting means arranged between said groups of stations and responsive to the code on said elements for determining the station in said one group from which said elements are to be removed and the stations in the other of said groups to which said elements are to be delivered and for controlling said pneumatic means in accordance with the code on each of said elements.

References Cited in the file of this patent

UNITED STATES PATENTS 2,257,220 Becker ---------------- Sept. 30, 1941